(12) United States Patent
Huang et al.

(10) Patent No.: US 12,165,072 B2
(45) Date of Patent: Dec. 10, 2024

(54) METHOD, ELECTRONIC DEVICE, AND STORAGE MEDIUM FOR EXPANDING DATA

(71) Applicant: Beijing Baidu Netcom Science and Technology Co., Ltd., Beijing (CN)

(72) Inventors: Pingping Huang, Beijing (CN); Quan Wang, Beijing (CN); Wenbin Jiang, Beijing (CN); Pengcheng Yuan, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 930 days.

(21) Appl. No.: 17/213,952

(22) Filed: Mar. 26, 2021

(65) Prior Publication Data

US 2021/0216885 A1      Jul. 15, 2021

(30) Foreign Application Priority Data

Apr. 8, 2020   (CN) .......................... 202010268590.1

(51) Int. Cl.
*G06N 5/02*   (2023.01)
*G06F 18/20*  (2023.01)
(Continued)

(52) U.S. Cl.
CPC ......... *G06N 5/022* (2013.01); *G06F 18/2148* (2023.01); *G06F 18/29* (2023.01); *G06N 5/02* (2013.01)

(58) Field of Classification Search
None
See application file for complete search history.

(56) References Cited

U.S. PATENT DOCUMENTS

2016/0132501 A1* 5/2016 Mengle .............. G06F 16/9535
                                                                707/771
2018/0082197 A1* 3/2018 Aravamudan ......... G16B 50/10
(Continued)

FOREIGN PATENT DOCUMENTS

CN          106874380 A     6/2017
CN          109960722 A     7/2019
(Continued)

OTHER PUBLICATIONS

Japanese Office Action dated Jul. 15, 2022 issued in JP Application No. 2021-049353, no English translation.
(Continued)

*Primary Examiner* — Lut Wong
(74) *Attorney, Agent, or Firm* — Weaver Austin Villeneuve & Sampson LLP

(57) ABSTRACT

A method, apparatus, device, and storage medium for expanding data are disclosed. The method includes: acquiring a triplet from a knowledge graph; mining a relationship path equivalent to a relationship in the triplet from the knowledge graph, a subject in the triplet being used as a start point of the relationship path, and an object in the triplet being used as an end point of the relationship path; and expanding the triplet based on the relationship path to generate an expanded triplet. This implementation expands the triplet in the knowledge graph, and strengthens the association between the subject and the object in the triplet in a larger context, such that the association between the subject and the object in the triplet is more global.

15 Claims, 4 Drawing Sheets

(51) Int. Cl.
*G06F 18/214* (2023.01)
*G06N 5/022* (2023.01)

(56) References Cited

U.S. PATENT DOCUMENTS

| | | | |
|---|---|---|---|
| 2018/0232443 A1* | 8/2018 | Delgo | G06F 16/35 |
| 2019/0246122 A1 | 8/2019 | Zhang et al. | |
| 2020/0065416 A1* | 2/2020 | Gliozzo | G06N 5/02 |
| 2020/0074301 A1 | 3/2020 | Shang et al. | |

FOREIGN PATENT DOCUMENTS

| | | |
|---|---|---|
| JP | 2019074843 A | 5/2019 |
| WO | WO-2011142134 A1 | 11/2011 |

OTHER PUBLICATIONS

Extended European Search Report dated Sep. 28, 2021 issued in EP Application No. 21165621.0.
Zhang Wen et al, "Iteratively Learning Embeddings and Rules for Knowledge Graph Reasoning," The World Wide Web Conference, ACM, 2 Penn Plaza, Suite 701NEW YORKNY10121-0701USA, May 13, 2019 (May 13, 2019), pp. 2366-2377, XP058471269, DOI: 10.1145/3308558.3313612 ISBN: 978-1-4503-6674-8.
Lin Yankai et al, "Modeling Relation Paths for Representation Learning of Knowledge Bases," Proceedings of The 2015 Conference on Empirical Methods in Natural Language Processing, Jan. 1, 2015 (Jan. 1, 2015), pp. 705-714, XP055841112, Stroudsburg, PA, USA DOI: 10.18653/v1/D15-1082 Retrieved from the Internet: URL:https://arxiv.org/pdf/1506.00379.pdf>.
Guanglin Niu et al, "Rule-Guided Compositional Representation Learning on Knowledge Graphs," arxiv.org, Cornell University Library, 201 Olin Library Cornell University Ithaca, NY 14853, Nov. 20, 2019 (Nov. 20, 2019), XP081567341.
Chusyairi, A., et al., "The Use of Exponential Smoothing Method to Predict Missing Service E-Report," ICITISEE, 2017, pp. 39-44.
Sheng, C., et al., "New method for link prediction in directed networks based on triad patterns," Chinese Journal of Network and Information Security, 2019, vol. 5(5), pp. 39-47.
Zou, J., et al., "Research On Joint Extraction Method Of Entity And Relation Based On Deep Learning," University of Electronic Science and Technology of China, 2019, pp. 1-73.

* cited by examiner

METHOD, ELECTRONIC DEVICE, AND STORAGE MEDIUM FOR EXPANDING DATA

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and specifically to the field of knowledge graph technology.

BACKGROUND

Knowledge graph, also known as knowledge domain visualization or knowledge domain mapping map, is a series of various graphs showing a relationship between a knowledge development process and a knowledge structure, describes knowledge resources and carriers thereof using a visualization technology, and mines, analyzes, constructs, draws and shows knowledges and interrelationships thereof.

The knowledge graph is a knowledge base with a directed graph structure describing real knowledge of the world, and its basic component is a triplet (S, P, O). S (subject) and O (object) are nodes in the knowledge graph, and denote entities. S specifically denotes a subject, and O specifically denotes an object. P (predication) is an edge connecting two entities (S and O) in the knowledge graph, and denotes a relationship between the two entities. In existing knowledge graphs, an association between two entities is denoted by an edge P directly connecting the two entities, and the association denoted whereby is relatively partial.

SUMMARY

Embodiments of the present disclosure disclose a method, apparatus, device, and storage medium for expanding data.

In a first aspect, an embodiment of the present disclosure presents a method for expanding data, including: acquiring a triplet from a knowledge graph: mining a relationship path equivalent to a relationship in the triplet from the knowledge graph, a subject in the triplet being used as a start point of the relationship path, and an object in the triplet being used as an end point of the relationship path; and expanding the triplet based on the relationship path to generate an expanded triplet.

In a second aspect, an embodiment of the present disclosure presents an apparatus for expanding data, including: a first acquiring module configured to acquire a triplet from a knowledge graph: an mining module configured to mine a relationship path equivalent to a relationship in the triplet from the knowledge graph, a subject in the triplet being used as a start point of the relationship path, and an object in the triplet being used as an end point of the relationship path; and an expanding module configured to expand the triplet based on the relationship path to generate an expanded triplet.

In a third aspect, an embodiment of the present disclosure presents an electronic device, including: at least one processor; and a memory communicatively connected to the at least one processor: where the memory stores instructions are executable by the at least one processor, and the instructions are executed by the at least one processor, such that the at least one processor can execute the method according to any one implementation in the first aspect.

In a fourth aspect, an embodiment of the present disclosure presents a non-transient computer-readable storage medium storing computer instructions, where the computer instructions are used for causing a computer to execute the method according to any one implementation in the first aspect.

The method, apparatus, device, and storage medium for expanding data provided in embodiments of the present disclosure first acquire a triplet from a knowledge graph: then mine a relationship path equivalent to a relationship in the triplet from the knowledge graph; and finally expand the triplet based on the relationship path to generate an expanded triplet, thereby expanding the triplet in the knowledge graph, and strengthening the association between the subject and the object in the triplet in a larger context, such that the association between the subject and the object in the triplet is more global.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed description of non-limiting embodiments with reference to the following accompanying drawings, other features, objectives, and advantages of the present disclosure will become more apparent. The accompanying drawings are used for better understanding of the present solution, and do not impose a limitation on the present disclosure. In the figures.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
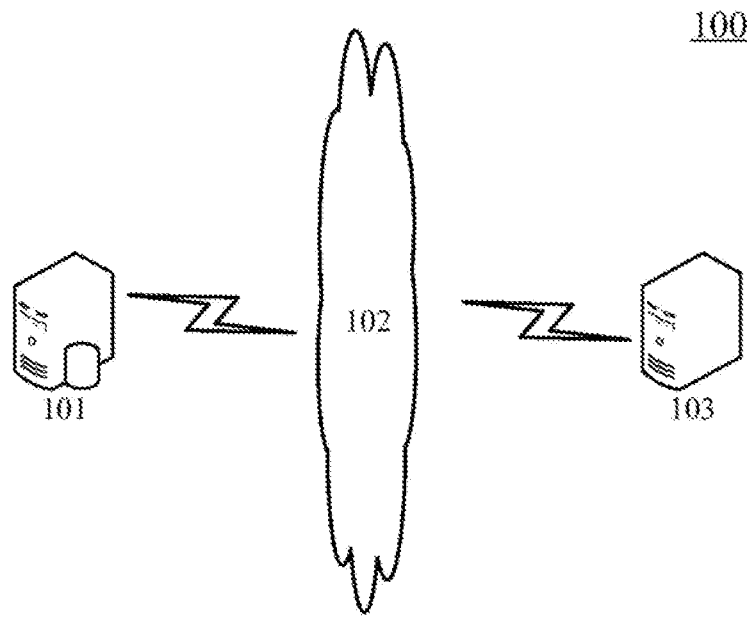
FIG. 1 is an example system architecture in which embodiments of the present disclosure may be implemented.

FIG. 1 shows an example system architecture 100 in which a method for expanding data or an apparatus for expanding data of an embodiment of the present disclosure may be implemented.

As shown in FIG. 1, the system architecture 100 may include a database server 101, a network 102, and a server 103. The network 102 serves as a medium providing a communication link between the database server 101 and the server 103. The network 102 may include various types of connections, such as wired or wireless communication links, or optical cables.

The database server 101 can store a knowledge graph, and provide the knowledge graph to the server 103 via the network 102.

The server 103 may provide various services. For example, the server 103 may process, e.g., analyze, data such as the knowledge graph acquired by the database server 101, and generate a processing result (e.g., an expanded triplet).

It should be noted that the server 103 may be hardware, or may be software. When the server 103 is hardware, the server may be implemented as a distributed server cluster composed of a plurality of servers, or may be implemented as a single server. When the server 103 is software, the server may be implemented as a plurality of software programs or software modules (e.g., software programs or software modules for providing distributed services), or be implemented as a single software program or software module. This is not specifically limited here.

It should be noted that the method for expanding data according to embodiments of the present disclosure is generally executed by the server 103. Accordingly, the apparatus for expanding data is generally provided in the server 103.

It should be understood that the numbers of database servers, networks, and servers in FIG. 1 are merely illustrative. Any number of database servers, networks, and servers may be provided based on actual requirements. In the case where the server 103 stores the knowledge graph, the system architecture 100 may not be provided with the database server 101 or the network 102.

Figure 2:
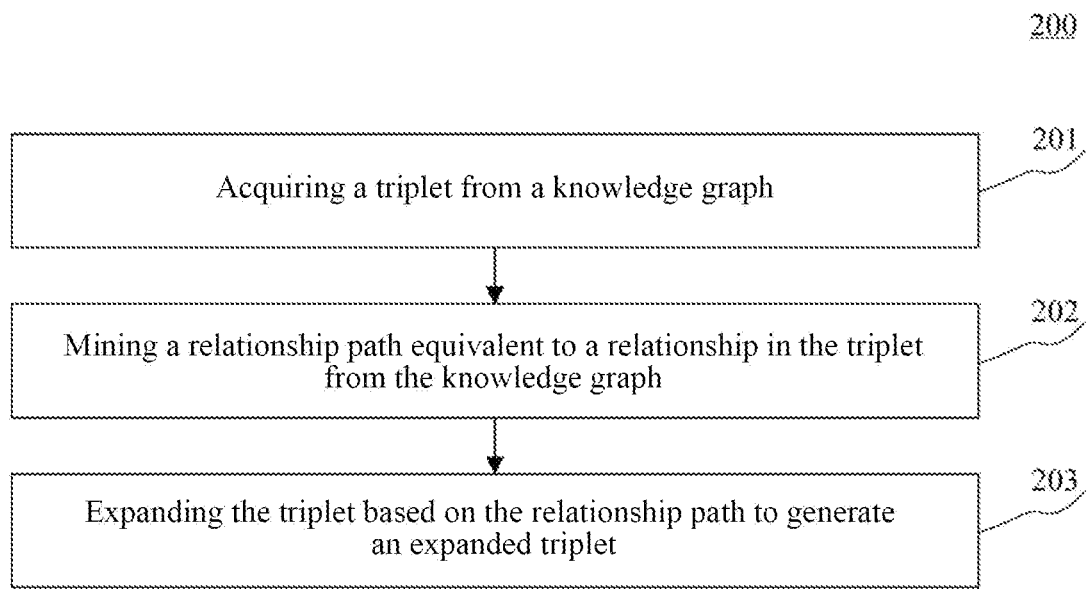
FIG. 2 is a flowchart of a method for expanding data according to an embodiment of the present disclosure.

Further referring to FIG. 2, a process 200 of a method for expanding data according to an embodiment of the present disclosure is shown. The method for expanding data includes the following steps:

Step 201: acquiring a triplet from a knowledge graph.

In the present embodiment, an executing body (e.g., the server 103 shown in FIG. 1) of the method for expanding data may acquire the triplet from the knowledge graph. The triplet acquired here may be any triplet in the knowledge graph.

Generally, the knowledge graph is a knowledge base with a directed graph structure describing real knowledge of the world, and its basic component is a triplet (S, P, O). S and O are nodes in the knowledge graph, and denote entities. S specifically denotes a subject, and O specifically denotes an object. P is an edge connecting two entities (S and O) in the knowledge graph, and denotes a relationship between the two entities. For example, for a triplet (A, daughter, B), A is a subject, B is an object, while the daughter is a relationship between A and B, and means that B is A's daughter.

Step 202: mining a relationship path equivalent to a relationship in the triplet from the knowledge graph.

In the present embodiment, the executing body can mine the relationship path equivalent to the relationship in the triplet from the knowledge graph. The relationship path may be a path formed by connecting at least one edge in the knowledge graph, the subject in the triplet is used as a start point of the relationship path, and the object in the triplet is used as an end point of the relationship path.

Generally, the relationship path may be mined by various mining tools, e.g., amiePlus, a rule mining tool based on statistical cooccurrence. The mining process is specifically as follows: first mining other triplet sequences that statistically cooccur with the subject S and the object O in the triplet (S, P, O) from the knowledge graph; and then sequentially combining relationships in the other triplet sequences, to generate the relationship path. Edges corresponding to the relationships in the other triplet sequences are connected end to end, an entity in a first one of other triplets in the other triplet sequences includes the subject S in the triplet (S, P, O), and an entity in a last one of the other triplets includes the object O in the triplet (S, P, O). For example, there is a plurality of sets of triplets in the knowledge graph as follows: (A, daughter, B), (B, mother, C), and (C, husband, A). (A, daughter, B) denotes that B is A's daughter, (B, mother, C) denotes that C is B's mother, and (C, husband, A) denotes that A is C's husband. For the triplet (A, daughter, B), a triplet sequence statistically cooccurring with A and B is (C, husband, A)→(B, mother, C), and a relationship "daughter" is equivalent to a relationship path "husband$^{-1}$→mother$^{-1}$." A direction of a relationship with a superscript "$^{-1}$" is opposite to a direction of a relationship without a superscript "$^{-1}$."

Step 203: expanding the triplet based on the relationship path to generate an expanded triplet.

In the present embodiment, the executing body can expand the triplet based on the relationship path to generate the expanded triplet. Generally, at least one entity in the expanded triplet is the same as at least one entity in the triplet. For example, a subject in the expanded triplet is the same as a subject in the triplet.

In some alternative implementations of the present embodiment, the executing body can replace a relationship P in the triplet (S, P, O) with the relationship path to generate an expanded triplet (S, path, O). For example, the relationship "daughter" in the triplet (A, daughter, B) is replaced with the relationship path "husband$^{-1}$→mother$^{-1}$," to generate an expanded triplet (A, husband$^{-1}$→mother$^{-1}$, B).

In some alternative implementations of the present embodiment, the executing body can first traverse the relationship path with the subject S in the triplet (S, P, O) as a start point, to obtain other object O' other than the object O in the triplet (S, P, O); and then replace the relationship P in the triplet (S, P, O) with the relationship path, and replace the object O in the triplet (S, P, O) with other object O', to generate an expanded triplet (S, path, O'). For example, there are also triplets (A, daughter, E) and (E, mother, C) in the knowledge graph. When traversing the relationship path "husband$^{-1}$→mother$^{-1}$" with the subject A in the triplet (A, daughter, B) as a start point, other object E other than the object B in the triplet (A, daughter, B) can be further obtained. The relationship "daughter" in the triplet (A, daughter, B) is replaced with the relationship path "husband$^{-1}$→mother$^{-1}$," and the object B in the triplet (A, daughter, B) is replaced with the object, to generate an expanded triplet (A, husband$^{-1}$→mother$^{-1}$, E).

The method, apparatus, device, and storage medium for expanding data provided in embodiments of the present disclosure first acquire a triplet from a knowledge graph; then mine a relationship path equivalent to a relationship in the triplet from the knowledge graph; and finally expand the triplet based on the relationship path to generate an expanded triplet, thereby expanding the triplet in the knowledge graph, and strengthening the association between the subject and the object in the triplet in a larger context, such that the association between the subject and the object in the triplet is more global.

Figure 3:
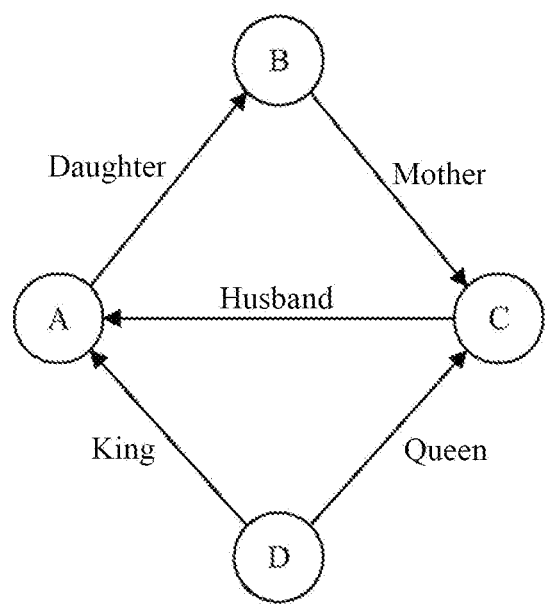
FIG. 3 is a scenario diagram in which the method for expanding data according to an embodiment of the present disclosure may be implemented.

To facilitate understanding, a scenario in which the method for expanding data according to an embodiment of the present disclosure may be implemented is provided below. As shown in FIG. 3, there is a plurality of sets of triplets in the knowledge graph as follows: (A, daughter, B), (B, mother, C), (C, husband, A). (D, king. A), and (D, queen. C). (A, daughter, B) denotes that B is A's daughter, (B, mother, C) denotes that C is B's mother, (C, husband, A) denotes that A is C's husband, (D, king, A) denotes that A is D's king, and (D, queen, C) denotes that C is D's queen. For the triplet (C, husband, A), a relationship "husband" is equivalent to a relationship path "mother$^{-1}$→daughter$^{-1}$," and an expanded triplet corresponding to the triplet (C, husband, A) is (C, mother$^{-1}$→daughter$^{-1}$, A). For the triplet (D, queen, C), a relationship "queen" is equivalent to a relationship path "king→husband$^{-1}$," and an expanded triplet corresponding to the triplet (D, queen, C) is (D, king→husband$^{-1}$, C). For the triplet (B, mother, C), a relationship "mother" is equivalent to a relationship path "daughter$^{-1}$," and an expanded triplet corresponding to the triplet (B, mother, C) is (B, daughter$^{-1}$, C). A direction of a relationship with a superscript "$^{-1}$" is opposite to a direction of a relationship without a superscript "$^{-1}$."

Figure 4:
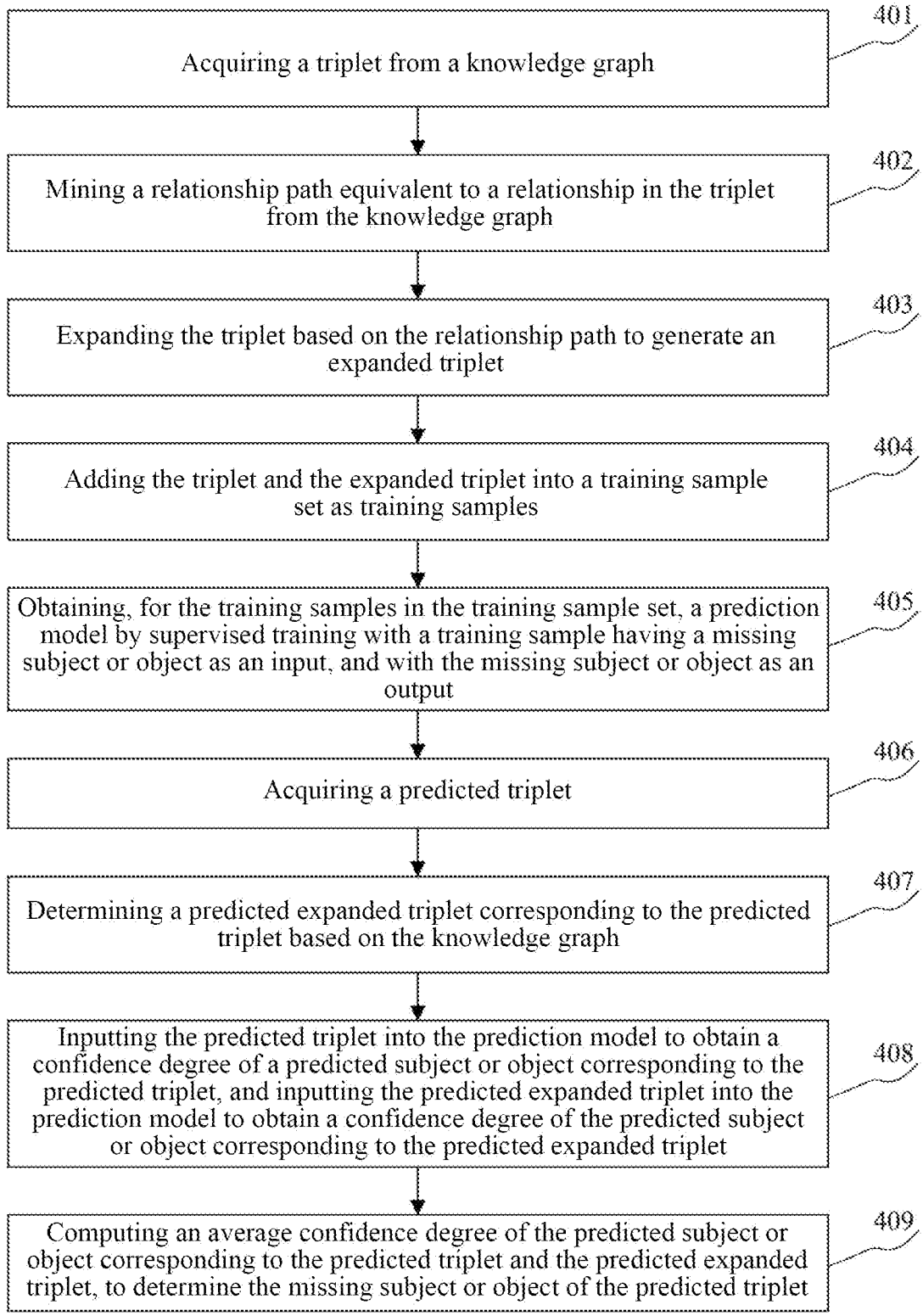
FIG. 4 is a flowchart of the method for expanding data according to another embodiment of the present disclosure.

Further referring to FIG. 4, a process 400 of the method for expanding data according to another embodiment of the present disclosure is shown. The method for expanding data includes the following steps:

Step 401: acquiring a triplet from a knowledge graph.
Step 402: mining a relationship path equivalent to a relationship in the triplet from the knowledge graph.
Step 403: expanding the triplet based on the relationship path to generate an expanded triplet.

In the present embodiment, specific operations of steps 401-403 have been introduced in detail in steps 201-203 in the embodiment shown in FIG. 2. The description will not be repeated here.

Step 404: adding the triplet and the expanded triplet into a training sample set as training samples.

In the present embodiment, an executing body (e.g., the server 103 shown in FIG. 1) of the method for expanding data may add most triplets in the knowledge graph and corresponding expanded triplets into the training sample set as the training samples. A triplet is a training sample, and an expanded triplet is also a training sample. Compared with existing technologies that only use triplets in a knowledge graph as training samples, contents of the training sample set are enriched. In addition, the expanded triplet is also used as the training sample, thereby strengthening a corresponding relationship between the relationship path and the relationship in the training sample set, such that the association between the subject and the object in the training sample is more global.

Step 405: obtaining, for the training samples in the training sample set, a prediction model, a machine-learning model, by supervised training or supervised learning with a training sample having a missing subject or object as an input, and with the missing subject or object as an output.

In the present embodiment, the executing body can obtain a prediction model, a machine-learning model, by supervised training or learning of a to-be-trained model using the training sample set that includes both the triplet and the expanded triplet. Specifically, for the training samples in the training sample set, the executing body can obtain the prediction model by supervised training of the to-be-trained model with the training sample having the missing subject or object as the input, and with the missing subject or object as the output. For example, for the triplet (S, P, O) and the expanded triplets (S, path, O) and (S, path, O') in the training sample set, the prediction model is obtained by supervised training of the to-be-trained model with (S, P, ?) as an input, with O as an output, with (S, path, ?) as an input, with O or O' as an output, with (?, P, O), (?, path, O), and (?, path, O') as inputs, and with S as an output. The to-be-trained model may be any model that supports sequence data of a plurality of relationships, such as a pathRNN model, or a CompTansE model.

The prediction model is trained using the triplets and the expanded triplets, thereby strengthening a corresponding relationship between the relationship and the relationship path that the prediction model learns when performing representation learning, and the association relationship between remote subject S and object O' in a larger context.

Step 406: acquiring a predicted triplet.

In the present embodiment, the executing body may acquire the predicted triplet. The predicted triplet has a missing subject or object, e.g., (S, P, ?) or (?, P, O). The predicted triplet may be a small part of triplets in the knowledge graph. Generally, the predicted triplet is different from the triplet in the training sample set.

Step 407: determining a predicted expanded triplet corresponding to the predicted triplet based on the knowledge graph.

In the present embodiment, the executing body can determine the predicted expanded triplet corresponding to the predicted triplet based on the knowledge graph. Generally, the predicted expanded triplet may also be acquired by expanding the predicted triplet through the method for expanding data. For example, for the predicted triplet (S, P, ?) or (?, P, O), the corresponding predicted expanded triplet may be (S, path, ?) or (?, path, O).

Step 408: inputting the predicted triplet into the prediction model to obtain a confidence degree of a predicted subject or object corresponding to the predicted triplet, and inputting the predicted expanded triplet into the prediction model to obtain a confidence degree of the predicted subject or object corresponding to the predicted expanded triplet.

In the present embodiment, the executing body can input the predicted triplet into the prediction model to obtain the confidence degree of the predicted subject or object corresponding to the predicted triplet, and input the predicted expanded triplet into the prediction model to obtain the confidence degree of the predicted subject or object corresponding to the predicted expanded triplet. Generally, by inputting the predicted triplet into the prediction model, the confidence degree of the predicted subject or object corresponding to the predicted triplet can be outputted. This confidence degree is a confidence degree that the missing subject or object in the predicted triplet belongs to each entity. Likewise, by inputting the predicted expanded triplet into the prediction model, the confidence degree of the predicted subject or object corresponding to the predicted expanded triplet can be outputted. This confidence degree is a confidence degree that the missing subject or object in the predicted expanded triplet belongs to each entity.

Step 409: computing an average of the confidence degree of the predicted subject or object corresponding to the predicted triplet and the predicted expanded triplet, to determine the missing subject or object of the predicted triplet.

In the present embodiment, the executing body can compute the average of the confidence degree of the predicted subject or object corresponding to the predicted triplet and the predicted expanded triplet, to determine the missing subject or object of the predicted triplet. Generally, the executing body can compute an average of the confidence degree that the missing subject or object in the predicted triplet and the predicted expanded triplet belongs to each entity, to determine the missing subject or object.

An expanded data set of the knowledge graph is used in the training and prediction of the prediction model. Compared with the existing technologies that model training based on a granularity of a single triplet (S, P, O) is only intended to optimize a discriminant function f(S, P, O), such that the model can determine whether (S, P, O) is a tenable fact (f(S, P, O)=1) or an untenable fact (f(S, P, O)=0)), and classification results of the prediction model are more interpretable, thereby explaining the intermediate logic of reasoning for whether a test triplet is tenable based on the relationship path. For example, the prediction model trained using the expanded training sample set not only can determine whether the triplet (S, P, O) is tenable, but also will explain the triplet (S, P, O) based on the relationship path corresponding to the relationship P in the triplet (S, P, O).

In the training and prediction of the prediction model, when inputting a triplet or an expanded triplet denoted by a discrete symbol, the prediction model can convert an entity and a relationship inputted thereinto into consecutive vectors to obtain a knowledge graph representation. The prediction model can first predict consecutive vectors of a missing entity based on consecutive vectors corresponding to an entity and consecutive vectors corresponding to a relationship; and then determine the missing entity based on consecutive vectors of a predicted missing entity. The knowledge graph representation means to denote an entity and a relationship of a discrete symbol in a knowledge graph in the form of consecutive vectors. Consecutive vector representations not only can retain key structural information of an entity in a knowledge graph, but also facilitates the use of knowledge by a downstream application task. At present, in any task such as information extraction, question and answer, and reading comprehension, a knowledge graph is applied and functioned in the form of vectors. The training sample set is expanded using the expanded triplet, thereby improving the effect of knowledge graph representation learning, and contributing to the use of the knowledge graph by the prediction model.

As can be seen from FIG. 4, compared with the corresponding embodiment of FIG. 2, the process 400 of the method for expanding data in the present embodiment additionally provides model training and model prediction. Therefore, in the solution described in the present embodiment, in a first aspect, the training sample set is expanded using the expanded triplet, thereby enriching the contents of the training sample set. In addition, the expanded triplet is also used as the training sample, thereby strengthening a corresponding relationship between the relationship path and the relationship in the training sample set, such that the association between the subject and the object in the training sample is more global. In a second aspect, the prediction model is trained using the expanded training sample set, thereby strengthening a corresponding relationship between the relationship and the relationship path that the prediction model learns when performing representation learning to make the association between a plurality of relationships stronger, and improving the effect of the prediction model. In a third aspect, during model testing, a corresponding relationship path of the test triplet is expanded and is involved in the computation of the classification result together, such that the classification result of the prediction model is more interpretable, thereby explaining the intermediate logic of reasoning for whether the test triplet is tenable based on the relationship path.

Figure 5:
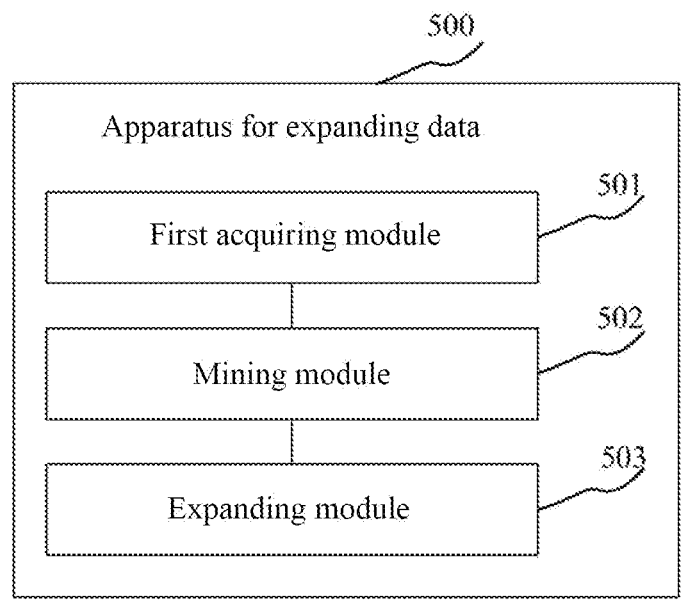
FIG. 5 is a schematic structural diagram of an apparatus for expanding data according to an embodiment of the present disclosure.

Further referring to FIG. 5, as an implementation of the method shown in the above figures, an embodiment of the present disclosure provides an apparatus for expanding data. The embodiment of the apparatus corresponds to the embodiment of the method shown in FIG. 2, and the apparatus may be specifically applied to various electronic devices.

As shown in FIG. 5, the apparatus 500 for expanding data of the present embodiment may include: a first acquiring module 501, a mining module 502, and an expanding module 503. The first acquiring module 501 is configured to acquire a triplet from a knowledge graph: the mining module 502 is configured to mine a relationship path equivalent to a relationship in the triplet from the knowledge graph, a subject in the triplet being used as a start point of the relationship path, and an object in the triplet being used as an end point of the relationship path; and the expanding module 503 is configured to expand the triplet based on the relationship path to generate an expanded triplet.

The related description of steps 201-203 in the corresponding embodiment of FIG. 2 may be referred to for specific processing of the first acquiring module 501, the mining module 502, and the expanding module 503 of the apparatus 500 for expanding data in the present embodiment and the technical effects thereof, respectively. The description will not be repeated here.

In some alternative implementations of the present embodiment, the mining module 502 is further configured to: mine other triplet sequences that statistically cooccur with the subject and the object in the triplet from the knowledge graph; and sequentially combine relationships in the other triplet sequences, to generate the relationship path.

In some alternative implementations of the present embodiment, the expanding module 503 is further configured to: replace a relationship in the triplet with the relationship path to generate the expanded triplet.

In some alternative implementations of the present embodiment, the expanding module 503 is further configured to: traverse the relationship path with the subject in the triplet as a start point, to obtain other object other than the object in the triplet; and replace the relationship in the triplet with the relationship path, and replace the object in the triplet with other object, to generate the expanded triplet.

In some alternative implementations of the present embodiment, the apparatus 500 for expanding data further includes: an adding module (not shown in the figure) configured to add the triplet and the expanded triplet into a training sample set as training samples; and a training module (not shown in the figure) configured to obtain, for the training samples in the training sample set, a prediction model by supervised training with a training sample having a missing subject or object as an input, and with the missing subject or object as an output.

In some alternative implementations of the present embodiment, the apparatus 500 for expanding data further includes: a second acquiring module (not shown in the figure) configured to acquire a predicted triplet, where the predicted triplet has a missing subject or object: a determining module (not shown in the figure) configured to determine a predicted expanded triplet corresponding to the predicted triplet based on the knowledge graph: a predicting module (not shown in the figure) configured to input the predicted triplet into the prediction model to obtain a confidence degree of a predicted subject or object corresponding to the predicted triplet, and input the predicted expanded triplet into the prediction model to obtain a confidence degree of the predicted subject or object corresponding to the predicted expanded triplet; and a computing module (not shown in the figure) configured to compute an average of the confidence degree of the predicted subject or object corresponding to the predicted triplet and the predicted expanded triplet, to determine the missing subject or object of the predicted triplet.

According to an embodiment of the present disclosure, the present disclosure further provides an electronic device and a readable storage medium.

Figure 6:
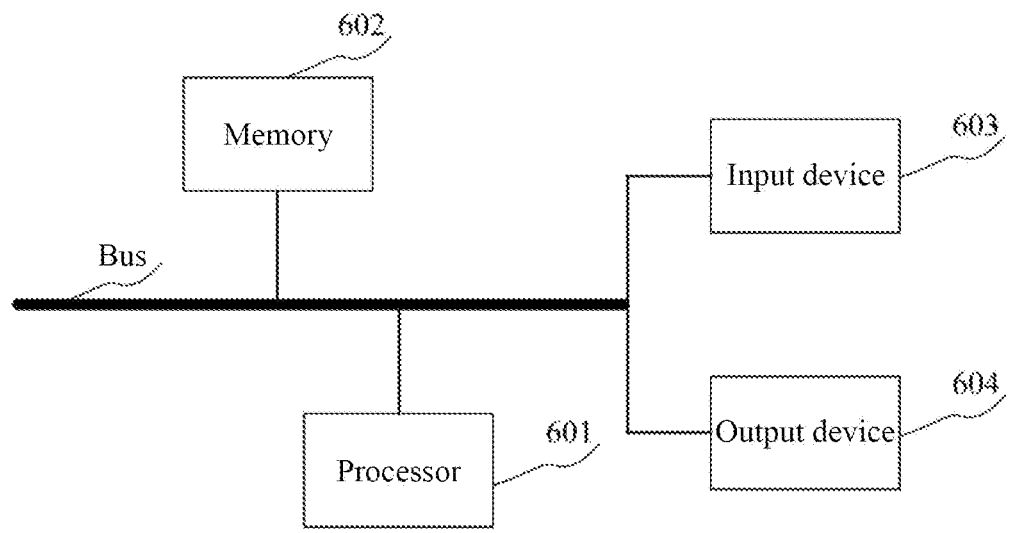
FIG. 6 is a block diagram of an electronic device configured to implement the method for expanding data of embodiments of the present disclosure.

As shown in FIG. 6, a block diagram of an electronic device configured to implement the method for expanding data according to embodiments of the present disclosure is shown. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 6, the electronic device includes: one or more processors 601, a memory 602, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or on the memory to display graphical information for a GUI on an external input/output device (e.g., a display device coupled to an interface). In other implementations, a plurality of processors and/or a plurality of buses may be used, as appropriate, along with a plurality of memories and a plurality of memories. Similarly, a plurality of electronic devices may be connected, with each device providing portions of necessary operations (e.g., as a server array, a group of blade servers, or a multi-processor system). In FIG. 6, a processor 601 is taken as an example.

The memory 602 is a non-transient computer-readable storage medium provided in the present disclosure. The memory stores instructions executable by at least one processor, such that the at least one processor executes the method for expanding data provided in the present disclosure. The non-transient computer-readable storage medium of the present disclosure stores computer instructions. The computer instructions are used for causing a computer to execute the method for expanding data provided in the present disclosure.

As a non-transient computer-readable storage medium, the memory 602 may be configured to store non-transient software programs, non-transient computer-executable programs, and modules, e.g., the program instructions/modules (e.g., the first acquiring module 501, the mining module 502, and the expanding module 503 shown in FIG. 5) corresponding to the method for expanding data in embodiments of the present disclosure. The processor 601 runs non-transient software programs, instructions, and modules stored in the memory 602, to execute various function applications and data processing of a server, i.e., implementing the method for expanding data in the above embodiments of the method.

The memory 602 may include a program storage area and a data storage area, where the program storage area may store an operating system and application programs required by at least one function; and the data storage area may store, e.g., data created based on use of the electronic device of the method for expanding data. In addition, the memory 602 may include a high-speed random-access memory, and may further include a non-transient memory, such as at least one magnetic disk storage component, a flash memory component, or other non-transient solid state storage components. In some embodiments, the memory 602 alternatively includes memories disposed remotely relative to the processor 601, and these remote memories may be connected to the electronic device of the method for expanding data via a network. Examples of the above network include, but are not limited to, the Internet, an intranet, a local area network, a mobile communication network, and a combination thereof.

The electronic device of the method for expanding data may further include: an input device 603 and an output device 604. The processor 601, the memory 602, the input device 603, and the output device 604 may be connected through a bus or in other manners. Bus connection is taken as an example in FIG. 6.

The input device 603 can receive inputted number or character information, and generate key signal input related to user settings and function control of the electronic device of the method for expanding data, e.g., an input device such as a touch screen, a keypad, a mouse, a trackpad, a touchpad, an indicating arm, one or more mouse buttons, a trackball, and a joystick. The output device 604 may include a display device, an auxiliary lighting apparatus (e.g., an LED), a haptic feedback apparatus (e.g., a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein may be implemented in a digital electronic circuit system, an integrated circuit system, an ASIC (application specific integrated circuit), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input device, and at least one output device.

These computing programs (also known as programs, software, software applications, or code) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user); and a keyboard and a pointing apparatus (e.g., a mouse or a trackball) by which the user can provide an input to the computer. Other kinds of apparatus may also be used to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by any form or medium of digital data communication (e.g., a communication network). Examples of the communication network include: a local area network (LAN), a wide area network (WAN), and the Internet.

The computer system may include a client terminal and a server. The client terminal and the server are generally remote from each other, and usually interact through a communication network. The relationship of the client terminal and the server arises by virtue of computer programs that run on corresponding computers and have a client-server relationship with each other.

The solutions according to the present disclosure first acquire a triplet from a knowledge graph; then mine a relationship path equivalent to a relationship in the triplet from the knowledge graph; and finally expand the triplet based on the relationship path to generate an expanded triplet, thereby expanding the triplet in the knowledge graph, and strengthening the association between the subject and the object in the triplet in a larger context, such that the association between the subject and the object in the triplet is more global.

It should be understood that the various forms of processes shown above can be used to reorder, add, or delete steps. For example, the steps described in the present disclosure can be executed in parallel, sequentially, or in different orders, as long as the desired results of the technical solutions disclosed in the present disclosure can be achieved. This is not limited herein.

The above specific implementations do not constitute a limitation to the protection scope of the present disclosure. It should be understood by those skilled in the art that various modifications, combinations, sub-combinations, and substitutions may be made according to the design requirements and other factors. Any modification, equivalent replacement, improvement, and the like made within the spirit and principle of the present disclosure should be included within the protection scope of the present disclosure.

What is claimed is:

1. A method for expanding data, comprising:
   acquiring a triplet from a knowledge graph;
   mining a relationship path equivalent to a relationship in the triplet from the knowledge graph, a subject in the triplet being used as a start point of the relationship path, and an object in the triplet being used as an end point of the relationship path;
   expanding the triplet based on the relationship path to generate an expanded triplet;
   adding the triplet and the expanded triplet into a training sample set as training samples; and
   obtaining, for the training samples in the training sample set, a prediction model by supervised training with a training sample having a missing subject or object as an input, and with the missing subject or object as an output.

2. The method according to claim 1, wherein the mining the relationship path equivalent to the relationship in the triplet from the knowledge graph comprises:
   mining other triplet sequences that statistically cooccur with the subject and the object in the triplet from the knowledge graph; and
   sequentially combining relationships in the other triplet sequences to generate the relationship path.

3. The method according to claim 1, wherein the expanding the triplet based on the relationship path to generate the expanded triplet comprises:
   replacing the relationship in the triplet with the relationship path to generate the expanded triplet.

4. The method according to claim 1, wherein the expanding the triplet based on the relationship path to generate the expanded triplet comprises:
   traversing the relationship path with the subject in the triplet as the start point to obtain another object other than the object in the triplet; and
   replacing the relationship in the triplet with the relationship path, and replacing the object in the triplet with the another object, to generate the expanded triplet.

5. The method according to claim 1, wherein the method further comprises:
   acquiring a predicted triplet, wherein the predicted triplet has a missing subject or object;
   determining a predicted expanded triplet corresponding to the predicted triplet based on the knowledge graph;
   inputting the predicted triplet into the prediction model to obtain a confidence degree of a predicted subject or object corresponding to the predicted triplet, and inputting the predicted expanded triplet into the prediction model to obtain a confidence degree of the predicted subject or object corresponding to the predicted expanded triplet; and
   computing an average of the confidence degree of the predicted subject or object corresponding to the predicted triplet and the predicted expanded triplet, to determine the missing subject or object of the predicted triplet.

6. An electronic device, comprising:
at least one processor; and
a memory communicatively connected to the at least one processor; wherein the memory stores instructions executable by the at least one processor, and the instructions are executed by the at least one processor, such that the at least one processor can perform operations comprising:
acquiring a triplet from a knowledge graph;
mining a relationship path equivalent to a relationship in the triplet from the knowledge graph, a subject in the triplet being used as a start point of the relationship path, and an object in the triplet being used as an end point of the relationship path;
expanding the triplet based on the relationship path to generate an expanded triplet;
adding the triplet and the expanded triplet into a training sample set as training samples; and
obtaining, for the training samples in the training sample set, a prediction model by supervised training with a training sample having a missing subject or object as an input, and with the missing subject or object as an output.

7. The electronic device according to claim 6, wherein the mining the relationship path equivalent to the relationship in the triplet from the knowledge graph comprises:
mining other triplet sequences that statistically cooccur with the subject and the object in the triplet from the knowledge graph; and
sequentially combining relationships in the other triplet sequences to generate the relationship path.

8. The electronic device according to claim 6, wherein the expanding the triplet based on the relationship path to generate the expanded triplet comprises:
replacing the relationship in the triplet with the relationship path to generate the expanded triplet.

9. The electronic device according to claim 6, wherein the expanding the triplet based on the relationship path to generate the expanded triplet comprises:
traversing the relationship path with the subject in the triplet as the start point to obtain another object other than the object in the triplet; and
replacing the relationship in the triplet with the relationship path, and replacing the object in the triplet with the another object, to generate the expanded triplet.

10. The electronic device according to claim 6, wherein the operations further comprise:
acquiring a predicted triplet, wherein the predicted triplet has a missing subject or object;
determining a predicted expanded triplet corresponding to the predicted triplet based on the knowledge graph;
inputting the predicted triplet into the prediction model to obtain a confidence degree of a predicted subject or object corresponding to the predicted triplet, and inputting the predicted expanded triplet into the prediction model to obtain a confidence degree of the predicted subject or object corresponding to the predicted expanded triplet; and
computing an average of the confidence degree of the predicted subject or object corresponding to the predicted triplet and the predicted expanded triplet, to determine the missing subject or object of the predicted triplet.

11. A non-transitory computer-readable storage medium storing computer instructions, wherein the computer instructions when executed by a computer, cause the computer to perform operations comprising:
acquiring a triplet from a knowledge graph;
mining a relationship path equivalent to a relationship in the triplet from the knowledge graph, a subject in the triplet being used as a start point of the relationship path, and an object in the triplet being used as an end point of the relationship path;
expanding the triplet based on the relationship path to generate an expanded triplet;
adding the triplet and the expanded triplet into a training sample set as training samples; and
obtaining, for the training samples in the training sample set, a prediction model by supervised training with a training sample having a missing subject or object as an input, and with the missing subject or object as an output.

12. The non-transitory computer-readable storage medium according to claim 11, wherein the mining the relationship path equivalent to the relationship in the triplet from the knowledge graph comprises:
mining other triplet sequences that statistically cooccur with the subject and the object in the triplet from the knowledge graph; and
sequentially combining relationships in the other triplet sequences to generate the relationship path.

13. The non-transitory computer-readable storage medium according to claim 11, wherein the expanding the triplet based on the relationship path to generate the expanded triplet comprises:
replacing the relationship in the triplet with the relationship path to generate the expanded triplet.

14. The non-transitory computer-readable storage medium according to claim 11, wherein the expanding the triplet based on the relationship path to generate the expanded triplet comprises:
traversing the relationship path with the subject in the triplet as the start point to obtain another object other than the object in the triplet; and
replacing the relationship in the triplet with the relationship path, and replacing the object in the triplet with the another object, to generate the expanded triplet.

15. The non-transitory computer-readable storage medium according to claim 11, wherein the operations further comprise:
acquiring a predicted triplet, wherein the predicted triplet has a missing subject or object;
determining a predicted expanded triplet corresponding to the predicted triplet based on the knowledge graph;
inputting the predicted triplet into the prediction model to obtain a confidence degree of a predicted subject or object corresponding to the predicted triplet, and inputting the predicted expanded triplet into the prediction model to obtain a confidence degree of the predicted subject or object corresponding to the predicted expanded triplet; and
computing an average of the confidence degree of the predicted subject or object corresponding to the predicted triplet and the predicted expanded triplet, to determine the missing subject or object of the predicted triplet.

* * * * *